US008358787B2

(12) United States Patent
Lee et al.

(10) Patent No.: US 8,358,787 B2
(45) Date of Patent: Jan. 22, 2013

(54) METHOD AND APPARATUS FOR ACOUSTICS TESTING OF A PERSONAL MOBILE DEVICE

(75) Inventors: Michael M. Lee, San Jose, CA (US); Chad G. Seguin, Morgan Hill, CA (US); Bob Burrough, Anderson, CA (US); Richard Hung Minh Dinh, San Jose, CA (US); Cyril Labidi, San Francisco, CA (US); Daniel Farrell, Concord, CA (US); Justin Gregg, San Franciso, CA (US); Tony Aghazarian, Saratoga, CA (US); Tang Yew Tan, San Francisco, CA (US); Christian Paez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1432 days.

(21) Appl. No.: 11/961,640

(22) Filed: Dec. 20, 2007

(65) Prior Publication Data

US 2009/0116656 A1 May 7, 2009

Related U.S. Application Data

(60) Provisional application No. 60/986,264, filed on Nov. 7, 2007.

(51) Int. Cl.
*H04R 29/00* (2006.01)
(52) U.S. Cl. ............................... 381/58; 381/59; 73/584
(58) Field of Classification Search .................... 381/58, 381/59, 60; 73/584, 1.182
See application file for complete search history.

(56) References Cited

U.S. PATENT DOCUMENTS

| 2002/0137506 | A1* | 9/2002 | Matsuoka | 455/425 |
| 2004/0224638 | A1* | 11/2004 | Fadell et al. | 455/66.1 |
| 2007/0255114 | A1* | 11/2007 | Ackermann et al. | 600/300 |
| 2008/0049147 | A1* | 2/2008 | Ho | 348/734 |

OTHER PUBLICATIONS

"Sound level meter", Wikipedia, the free encyclopedia, Oct. 31, 2007, Internet document at: http://en.wikipedia.org/wiki/Sound_level_meter, [pp. 1-6].
"Agilent E8421A Wireless Text Fixture", Product Overview, Improved time-to-volume while increasing production flexibility!, Agilent Technologies, Inc., Printed in USA Jan. 17, 2002, Copyright 2002, Literature No. 5988-3663EN, [16 pages].
"Personal Media Device Docking Station Having an Acoustic Interface", U.S. Appl. No. 11/716,080, filed Mar. 9, 2007, [Ref. No. P5178US1], [43 pages].

(Continued)

*Primary Examiner* — Minh-Loan T Tran
*Assistant Examiner* — Fazli Erdem
(74) *Attorney, Agent, or Firm* — Kilpatrick Townsend & Stockton LLP

(57) ABSTRACT

A portable handheld test fixture has an acoustic port, e.g. a speaker port, a microphone, and/or an earpiece/receiver port. Once the media device has been installed onto the test fixture, the port becomes acoustically coupled to a respective acoustic aperture of the media device that is associated with a speaker, a microphone, or an earpiece/receiver as the case may be. A sound test tool, e.g. a reference sound source and/or a sound pressure level, SPL, meter, has an input or output sound port that can be removably coupled to the acoustic port of the test fixture. Other embodiments are also described and claimed.

21 Claims, 11 Drawing Sheets

OTHER PUBLICATIONS

DuPriest, Dawn, "Combine RF and Audio Cell-Phone Tests", Test & Measurement World, Oct. 1, 1999, Test & Measurement World Print Page, Internet document at: http://www.tmworld.com/index.asp?layout=Print&articleID=. . . , [pp. 1-7].

Tun, Joey, "Archieving Quality Audio Testing for Mobile Phones", RFDESIGN, Jan. 1, 2006, Internet Document at: http://rfdesign.com/microwave_millimeter_tech/test_and_measurement/radio_achieving_quality_audio/index.html, [pp. 1-8].

* cited by examiner

METHOD AND APPARATUS FOR ACOUSTICS TESTING OF A PERSONAL MOBILE DEVICE

This application claims the benefit of the earlier filing date of U.S. provisional application Ser. No. 60/986,264, filed Nov. 7, 2007.

BACKGROUND

Personal mobile (personal wireless) devices such as the palm-sized, consumer grade, iphone media device by Apple, Inc. of Cupertino, Calif., empower its owner to perform several communications and entertainment functions while on the go. These may include playback of stored MP3 music files, reading and sending email messages and surfing the Web (which started as solely desktop computer functions), and/or making and receiving roaming telephone calls (which initially was predominantly a cellular handset function).

The testing of personal wireless consumer devices in the manufacturing and research and development setting has been well established. For example, one wireless test fixture platform uses a nest as a custom component of the overall fixture design that interfaces the unique characteristics of a particular cellular telephone handset (device under test) to hardware that is part of a standard base unit. The nest contains connections and physical components that interface to the specific type device and to the standard base unit. These include button pushing hardware, speaker and microphone for audio testing, and galvanic RF interface. These interface components, located on the custom nest, are connected to the standard base unit hardware for control and automation. Different custom nests, created for testing different types of cellular handsets as well their constituent circuit boards and sub-assemblies, can be quickly swapped to test different devices.

SUMMARY

An embodiment of the invention is a system for acoustic testing of a portable media device suitable for use in a retail store. A portable, handheld test fixture has at least one acoustic port being a speaker port, a microphone port, or an earpiece/receiver port. The design of the test fixture is such that the port becomes acoustically coupled to a respective acoustic aperture of the media device (which is associated with a speaker, microphone, or earpiece of the device as the case may be), once the device has been installed onto the test fixture. The system also has a sound test tool, such as a reference sound pressure source and/or a sound pressure level, SPL meter. The sound test tool has an input or output sound port as the case may be, that can be removably coupled to the acoustic port of the test fixture.

Depending on the particular test, the acoustic test signal may be generated in different ways. For instance, when testing the microphone, an external, reference sound source may be used to generate the test signal. For the speaker and earpiece tests, the test signal may be generated internally, by the media device itself. On the measurement side, the microphone test may be conducted using the available internal analog and digital audio processing capability of the device, to measure the signal detected by the microphone. For the receiver and speaker tests, the SPL meter may be used to measure the sound output pressure of the transducer. Other embodiments are also described.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
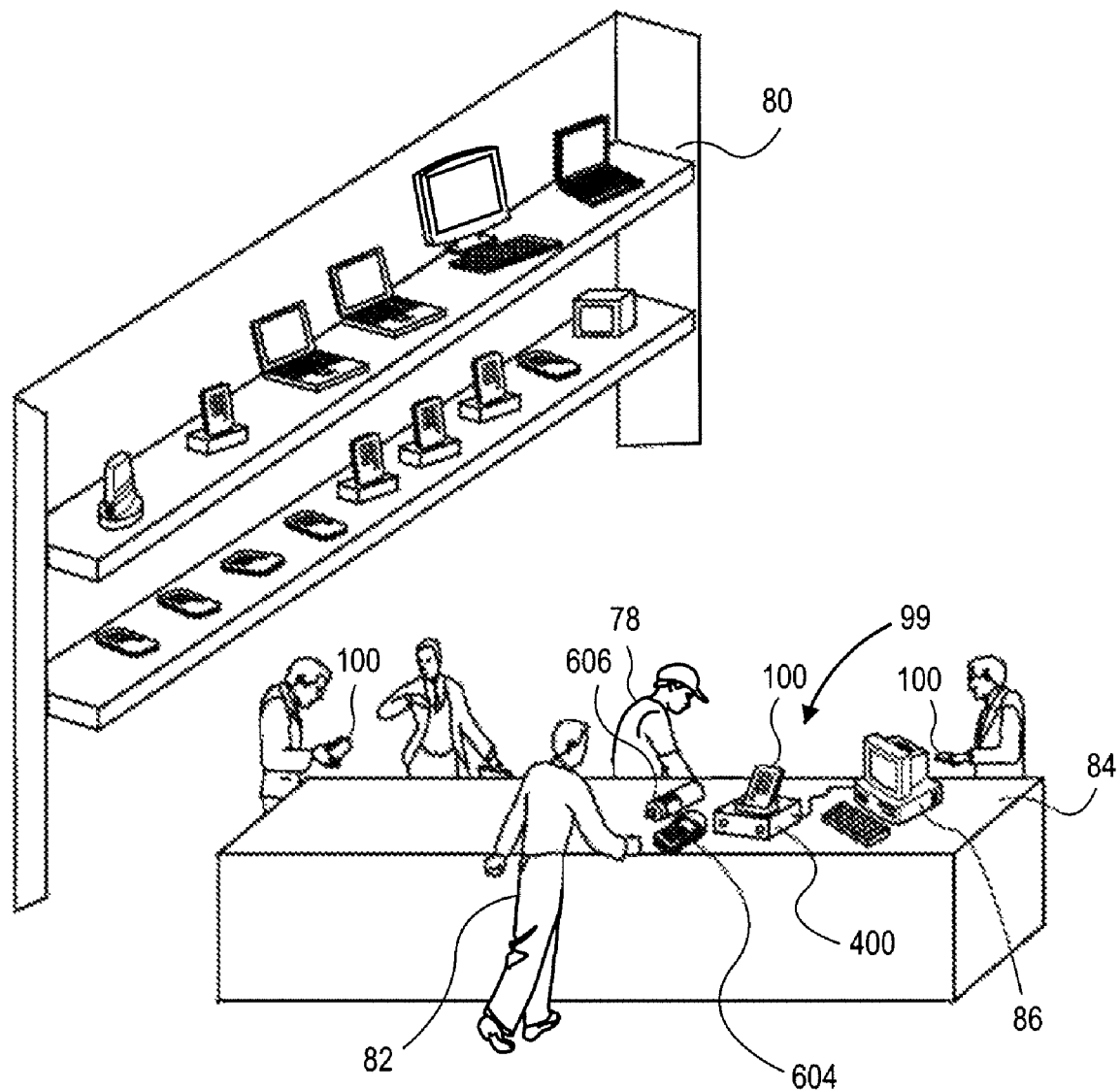
FIG. 1 shows an embodiment of the invention as an acoustics test system in use for testing a media device.

FIG. 1 shows an embodiment of the invention in which an acoustics test system 99 that is suitable for the acoustics testing of a personal mobile/wireless media device 100, such as the iPhone media device, is in use. A description of an example wireless media device is given further below, in connection with FIGS. 2-4. The media device 100 is a production specimen that has been purchased or otherwise acquired by an end user/consumer 78, prior to being tested by the system 99. The system 99 may be deployed and used in a consumer product retail store as depicted in FIG. 1. The store may include inventory that is for sale direct to the consumer, including software and hardware for personal desktop computers and wireless media devices, samples of which are on display on a shelf 80. The store also has one or more clerks 82 that are knowledgeable in operating the test system 99. The consumer 78 has brought his specimen of the device 100 into the store for evaluation. In one embodiment, the store clerk 82 will conduct a test of the specimen using the system 99, which may be deployed on a front counter or table 84 that is also exposed to all of the other customers in the store as shown. As explained below, in one embodiment, the system 99 can provide "on the spot" diagnosis of volume-related acoustic issues with the media device 100. Although one application of the test system 99 is for a specific type of wireless media device described in FIGS. 2-7 and 9-12, some of the broader concepts described here may also be applicable to other types of previously purchased, personal mobile/wireless media devices, including cellular handsets, laptop computers, and digital media players such as the iPod device by Apple, Inc.

In one embodiment, referring to FIG. 1, the system 99 has a portable, handheld test fixture 400 that lies on the fully exposed, horizontal surface of the table or countertop 84. This will allow both the store clerk 82 and the consumer 78 to simultaneously see the acoustics test being performed, as well as view the results of the test being shown on the built-in display of the device 100. The fixture 400 may also act as a docking station to the media device 100, by being connected to an in-store computer 86 via a communication cord. As an alternative, this docking connection may be a wireless one. The test fixture in general, may include a platform, support structure, or device holding mechanism, to enable convenient and efficient positioning and acoustic interfacing of the media device 100 with stand alone, sound test tools. In addition, the test fixture may be designed to interface with the media device 100 in a functionally more efficient or aesthetically pleasing position, e.g. secure the media device in a position that allows the consumer and store clerk to easily read its display during the various acoustic tests described here, and not obstruct the display during the acoustic tests, while simultaneously enabling efficient acoustic channels or pathways that couple the sound test tools to the respective acoustic apertures on the surface of the media device.

In one embodiment, the in-store computer 86 may be running a docking application (program) or other computer-to-computer communications application that has been modified to allow the store clerk to download test code into the docked device 100. In another embodiment, the test code may have been previously loaded into the device 100 (e.g., stored in its internal nonvolatile storage). Another embodiment may have the test code transferred to the device via a wireless connection from a local or remote server (in that case, the test fixture need not act as a wired docking station). Once activated or installed in the device 100, the test code causes the device 100 to become part of the system 99. The system 99 is used to test the integrated acoustics functions (microphone, receiver or earpiece, and in some cases a separate speaker) of the media device 100 at the front counter 84, while exposed to costumers in the store.

The fixture 400 has one or more of a microphone port, a receiver or earpiece port and a further speaker port. Once the device 100 has been installed as shown, one or more of these acoustic test ports become acoustically coupled to respective acoustic apertures in the device 100 (associated with the built-in microphone, receiver and/or speaker in the media device 100), through acoustic pathways formed in a body of the test fixture. The following is an example acoustics test process using the system 99, with references to the flow diagram in FIG. 8.

Figure 8:
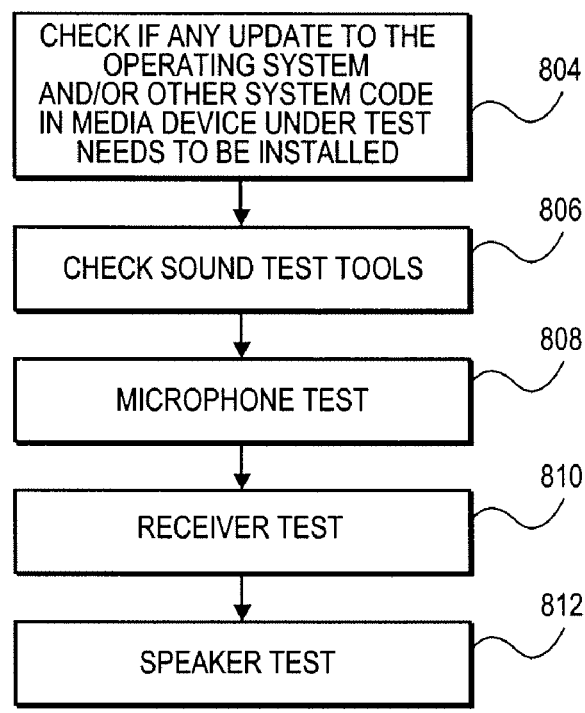
FIG. 8 is a flow diagram of an acoustics test process using the system.

A customer may walk into the store depicted in FIG. 1 and complain of her media device 100 not being loud enough, or that others complain that they cannot hear her when she is using her device 100 as a wireless telephone. The store clerk or the customer may then install the media device 100 into the test fixture 400, and turns on or wakes the device 100. In one embodiment, the device 100 is now connected (e.g., docked) with the in-store computer 86. After the in-store computer recognizes the device 100 and obtains information about its hardware and software components (including any updateable user software), a check is then made for any software updates that may be available for the device 100 and that may need to be installed (FIG. 8, operation 804). This may be done either automatically via a docking application running in the in-store computer 86, or manually under control of the store clerk 82. The updates may be for the operating system and/or any other system programs (user software) in the device 100. Such updates may be able to correct the acoustics-related problem that the customer is experiencing with her device 100. The updates if needed are then downloaded into the device 100 from the in-store computer and then installed or activated.

At this point, or later in the test process, the store clerk may download test code containing an acoustics test application (program) from the in-store computer into the device 100, through the docking connection. Alternatively, the test code may already be stored in the device 100, prior to it being docked with the in-store computer 86, e.g. as part of the operating system of the device 100. In another embodiment, the test code may be installed via a wireless connection to a local or remote server. In one embodiment, the test code contains an acoustic test application that may be automatically launched in the device 100 after being downloaded. This may cause a new window for the test application to appear in the built-in display of the device 100. This window can show several icons each associated with a different acoustics test to be run, e.g. "Receiver Test", "Microphone Test", and "Speaker Test." There may also be an "Exit" icon which, when clicked on, will cause the test application to quit, thereby bringing into the foreground of the device 100 some previously running application. In addition, the test application may automatically "disappear" from the device 100 after the next power-down/power-up cycle. In another embodiment, the test code contains firmware that is used to configure a data processing component, e.g. a base band processing component, in the device 100 to perform one or more functions of the acoustic test application program described below.

Before resuming interaction with the test application program, the store clerk may wish to check one or more sound tools that are part of the system 99 (FIG. 8, operation 806). The sound tools may include an off the shelf sound pressure level, SPL, meter 604, and an off the shelf reference sound pressure source 606. The store clerk can check proper operation of these tools by directly connecting the sound input port of the SPL meter 604 to the sound output port of the reference sound pressure source 606 (e.g., by simply inserting the input tube of the SPL meter into the output hole of the reference sound pressure source). The latter emits an acoustic test signal, e.g. one or more tones, having a defined spectrum and power level, that is typically identified visibly on the outside of the reference sound pressure source's housing (e.g., "1 KHz at 114 dB-SPL"). The SPL meter 604 may have a digital display that indicates certain parameters of the measured sound, e.g. in frequency and dB-SPL, at its input port. The store clerk can thus verify on this display whether or not the SPL meter is accurately measuring the test signal generated by the reference sound pressure source.

Once the sound test tools have been checked, the store clerk can resume the test process by connecting the appropriate sound tool to the designated acoustic port on the test fixture, and then interacting with the test application. For example, after connecting the reference sound source 606 (which may already be turned on and emitting the test signal) to the microphone port, the store clerk clicks on the microphone test icon in the test application's window (FIG. 8, operation 808). This will cause test code that is in the device 100 to be executed by its processor so as to sense or measure the output of the built-in microphone while it is subjected to the test signal being emitted by the reference sound pressure source 606. This measurement may be done using the same built-in, analog to digital and digital audio signal processing paths that connect the microphone to other storage (e.g., memory) in the device 100. The measurement may be in terms of spectral content and signal level, for example. These or the results of further processing of the measured data are then displayed on the built-in display of the device 100. The store clerk and the customer can now simultaneously see the measured results on the display of the device 100, and can compare them to the reference sound pressure source setting (which is typically indicated on the outside of the reference sound pressure source's housing). If the measured results are close enough to the indicated reference sound source setting, then the customer obtains some reassurance that the microphone function is working properly. The results may alternatively be compared to a defined nominal or minimal level stored in the test code.

The test code may be designed to display the results of the microphone test measurements using any suitable visual techniques, e.g. a bar graph that shows the instantaneous or temporally averaged measured sound level, together with an expected range metric that allows the consumer and store clerk to easily tell whether or not the measured sound level falls within the expected range being produced by the reference sound source.

In addition or as an alternative to the microphone test, the store clerk can conduct a receiver test (FIG. 8, operation 810) on the installed device 100. In this case, after connecting the SPL meter to the receiver port of the test fixture, the store clerk clicks on the receiver test icon. This will cause test code in the device 100 to be executed by its processor so as to generate an audio test signal, using the same built-in digital audio processing and digital to analog conversion path that connects digital storage (e.g., memory) in the device 100 to the built-in receiver or earpiece. The test signal, which is then emitted acoustically through the built-in receiver, may have a predefined spectral content and signal level (characteristics). The test code may also cause one or more of such identifying or unique characteristics of the test signal to be indicated on the display, while the test signal is active and being emitted by the receiver. Meanwhile, the SPL meter is sensing or measuring the acoustic output of the receiver, and is presenting the results of this sensing on its own integrated digital display. The store clerk and the customer can both see the measured results on the digital display of the SPL meter, and can compare them to the characteristics or setting of the test signal being shown on the display of the device 100. If the measured results are close enough to the indicated test signal setting, then the customer obtains some reassurance that the receiver function is working properly.

In some cases, the media device 100 may also have a speaker that may be used, for example, as a speakerphone during a wireless telephone call, or for playing back digital music and/or audio-video files that have been downloaded into the device 100. To test this speaker (FIG. 8, operation 812), the store clerk connects the SPL meter to the speaker port of the fixture, and then clicks on the speaker test icon. This will cause test code in the device 100 to be executed by its processor so as to generate an audio test signal that is acoustically emitted through the built-in speaker, having a predefined spectral content and sound level, for example. This may be done using the same built-in digital audio processing and digital to analog conversion path that connects digital storage (e.g., memory) in the media device 100 to the built-in speaker. The test code causes the characteristics of the test signal to be shown on the display, e.g. similar to the receiver test, while the test signal is active. Meanwhile, the SPL meter is sensing or measuring the acoustic output of the speaker, and the results of the sensing are presented on the digital display of the SPL meter. The store clerk and the customer can both see the measured results on the digital display of the SPL meter, and can compare them to the test signal setting being shown on the display of the device 100. If the measured results are close enough to the indicated test signal setting, then the customer obtains some reassurance that the speaker function of her media device 100 is working properly.

The test code may be designed to cause the built in display of the device 100 to show in real time what is being emitted from the speaker or receiver, in the form of, for example, a bar graph or other visual graphic that shows the spectral content, and/or the sound level that is being emitted, e.g. as part of an expected range. This allows the consumer and store clerk to easily tell whether or not the measured sound level by the SPL meter (shown on its digital display) falls within the expected range.

In another embodiment, rather than being generated within the device 100, the audio test signal to be emitted by the receiver or speaker may be received during a live, over the air telephone call or other wireless communication that is either initiated from the device 100, or made to the device 100. This telephone call or wireless communication is thus used to deliver the audio test signal into the device 100, where the signal engages the same circuitry and travels through the same path that an electronic version of a normal, non-testing audio signal would travel, from the antenna of the device through to the receiver or speaker. In this situation, the test code may be designed to display the expected sound level and/or spectral content of this received audio test signal that is being acoustically emitted through the receiver or speaker and measured by the SPL meter.

Figure 2:
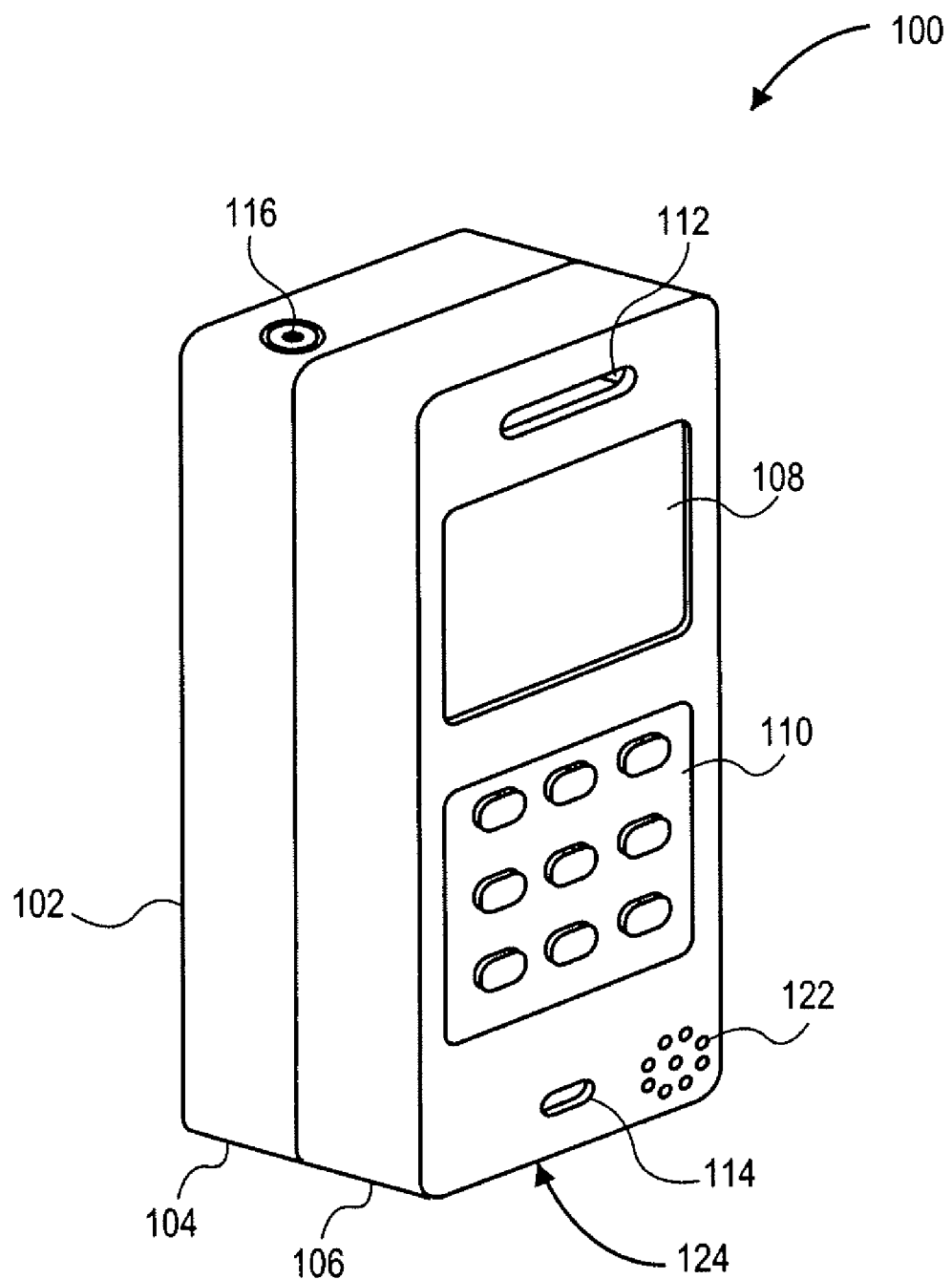
FIG. 2 is a perspective view of an example media device.

Referring now to FIG. 2, a perspective view of a media device 100, in accordance with an embodiment of the invention, is shown. The device 100 can be detachably mounted to or interfaced with the test fixture 400. A housing 102 includes a speaker housing acoustic aperture 122 that may be located in proximity to a lower portion of the media device 100 (referred to here as the bottom end). The bottom end may also contain a microphone, with associated microphone acoustic aperture 114 in the housing 102. In certain embodiments, the microphone aperture 114 and/or the speaker aperture 122 may be located on a bottom face 124 of the media device 100. More generally, the microphone aperture 114 and the speaker aperture 122 may be located on any other portion of the housing 102 that can facilitate the delivery and reception of sound in the manner in which the device 100 is intended to be used.

In one embodiment, the housing 102 includes a first housing portion 104 and a second housing portion 106 that are fastened together to encase various electronic components of the media device 100. The housing 102 may be made of polymer-based materials that are formed by, for instance, injection molding to define the form factor of the media device 100. The housing 102 may surround and/or support internal components, such as circuit boards having integrated circuit components, internal radio frequency circuitry, an internal antenna, a speaker, a microphone, a receiver (earpiece), nonvolatile mass storage such as nonvolatile solid state memory and/or a magnetic rotating disk drive, as well as other components. The housing 102 also provides for the mounting of a built-in display 108, a keypad 110, an earphone jack 116, and a battery charging jack (not shown). As an alternative to the separate display 108 and keypad 110, a single touch sensitive display that spans most of the area on the front face of the device 100 may be provided, for both showing information to the user, as well as accepting input by the user. In this particular embodiment, the media device 100 can be used as a wireless telephony handset, where receiver/ earpiece aperture 112 is positioned at the top end of the palm-sized media device 100 to facilitate such use of the device 100.

The media device may include a wireless communications function, such as cellular or satellite telephony, pager, portable laptop/notebook computer, or other wireless communications function. The media device 100 may be, for example, an iPod or iphone media device, or a palm sized personal computer such as an iPAQ Pocket PC available from Hewlett Packard, Inc., of Palo Alto, Calif. In some embodiments, the media device may synchronize with a remote computing system or server, to receive media using either a wireless or wireline communication path. Media may include sound or audio files, music, video, and other digital data, in either streaming and/or discrete (e.g., files) formats. The media device 100 may also have a wireline communication connector (not shown in FIG. 2), e.g. a 30-pin docking connector, that may be located on the bottom face of the device 100. This can be used to directly connect (e.g., dock) the device 100 to another computer.

During synchronization, a host system (e.g., the computer that is directly connected by the wireline communication connector) may provide media to a client software application embedded within the media device 100. The media and/or data may be downloaded into the media device 100, or the media device 100 may upload media to the remote host or another client system.

Figure 3:
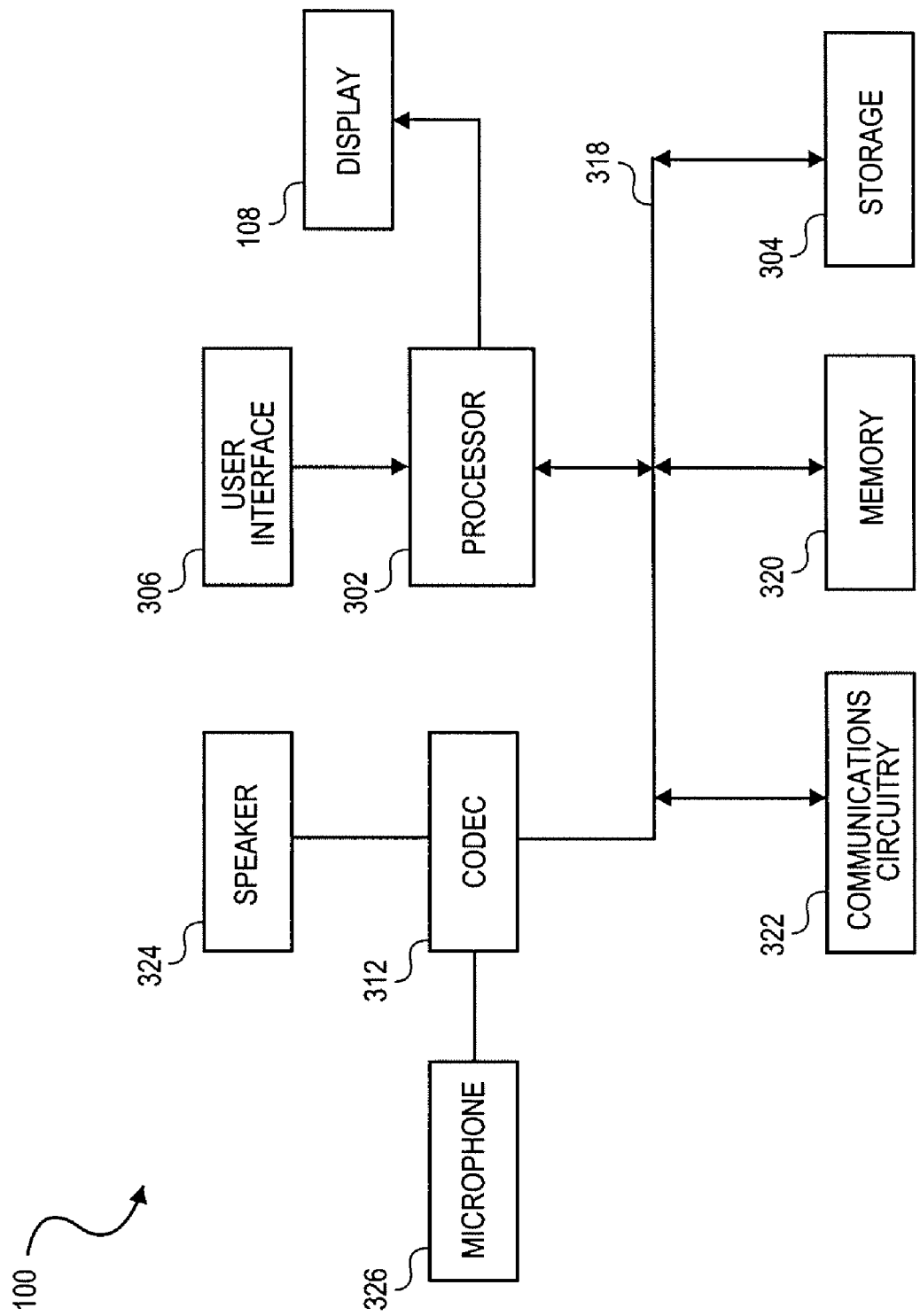
FIG. 3 is a functional block diagram of the example media device.

Turning now to FIG. 3, a simplified functional block diagram of the media device 100, according to an embodiment of the invention, is shown. A processor 302 may control the operation of many functions and other circuitry in the media device 100. The processor may, for example, drive the display 108 and may receive user inputs through the user interface 306 (which may be integrated with the display 108 as part of a single, touch sensitive display panel on the front face of the device 100). Storage 304 may be comprised of nonvolatile solid state memory and/or a kinetic nonvolatile storage device (e.g., rotating magnetic disk drive) that stores the different media (e.g., music and video files, functional software, preference information, e.g., for media playback, transaction information, e.g., information such as credit card information and other user authentication information, and wireless connection information, e.g., information that may enable the media device to establish wireless communication with another device).

In addition to the storage 304, there may be memory 320, also referred to as main memory or program memory, to store code and data being executed by the processor. Memory 320 may be comprised of solid state random access memory. A bus 318 provides a data transfer path between the memory 320, storage 304 and the processor 302. In addition, the bus 318 may also allow communications with a coder/decoder (codec) 312 that is a specialized circuit that converts a digital audio signal into an analog signal for driving the speaker 324 and/or the receiver (not shown). This is designed to produce sound, including voice, music and other like audio. The codec 312 may also convert sound detected by the microphone 326 into digital audio signals for storage and digital processing by the processor 302.

The media device 100 also includes communications circuitry 322 for external, wireless and wireline communications. For example, the communications circuitry 322 may implement Wi-Fi links according to IEEE 802.11 Industry Standards. The communications circuitry 322 may also include wireline network interface controllers (e.g., an Ethernet interface). These allow the media device 100 to appear and be accessed as an end node in the Internet.

The communications circuitry 322 may also implement wireless communications in accordance with standards such as Bluetooth, Global System for Mobile Communications (GSM) and/or code division multiple access (CDMA) wireless protocols. These may also allow the media device to function as a conventional cellular telephony handset, allowing its user to make and receive wireless phone calls.

In addition, the communications circuitry 322 may also include a direct interface to another computer or accessory device, such as in accordance with a computer peripheral bus standard (e.g., USB), or via a 30-pin docking connector.

All of the functionality shown in FIG. 3 may be integrated within a single housing that makes the media device 100 a portable computing device that is battery or fuel cell operated and is palm sized. In other embodiments, however, the media device 100 may be somewhat larger than palm size, e.g. a laptop or notebook computer, yet nevertheless, it is still considered a personal, consumer grade, stand alone mobile computing or media processing device.

Figure 4:
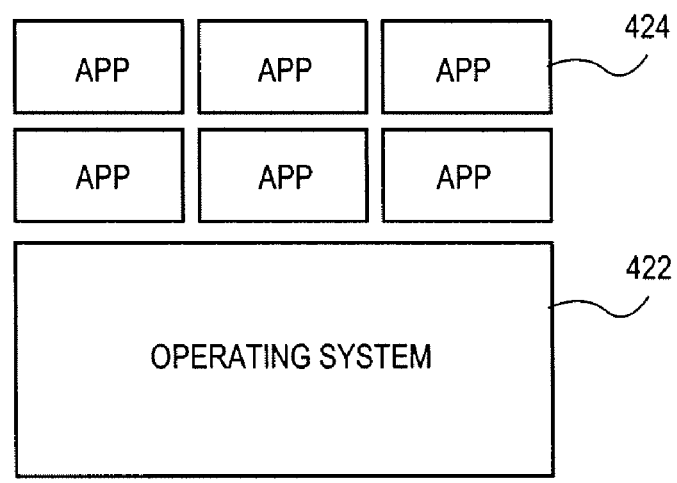
FIG. 4 if a flow diagram of an acoustics test process.

While FIG. 3 depicts a functional block diagram of the device 100 in terms of mostly hardware components, there are also several software components that control and manage, at a higher level, the different functions of the media device 100. Referring now to FIG. 4, there are at least two main layers of user software with which the media device can be configured. During the life cycle of the media device, one or more of these software components may be updated to either fix errors or enhance functionality. These user software components include an operating system 422, and several applications 424 that are said to run on top of the operating system 422. In the simplified block diagram of FIG. 3, both the operating system 422 and the applications 424 may be residing in main memory 320 while being executed by the processor 302. Other architectures for software, and the underlying hardware that will execute it, are possible, e.g. a processor that is cell based with multiple cell-type processing units in a data driven architecture.

In most instances, the operating system 422 is typically the first user level software that will be executed after any embedded, power on self-test routines are performed by the media device 100. After the operating system 422 has booted, one or more applications 424 may be automatically or manually (through user command) launched, to implement the different high level functions of the media device 100. For instance, there may be a cellular telephone application that configures a built-in touch sensitive display to look like the keypad of a telephony handset, and allows the user to enter a telephone number to be called, or select a previously stored number from a telephone address book. The cellular application may register the media device as a cellular handset with the nearest cellular base station (using the appropriate cellular communications protocols built into the media device). The application then proceeds to allow the user to make a call, and controls the built-in microphone and receiver to enable the user to experience a two-way conversation during the cellular phone call.

Another application 424 may be a browser application that allows the user to surf the Web on the built-in display and speaker, using, for example, the Wireless Access Protocol over a GSM wireless link.

Still another application 424 may be a media player application, such as an MP3 audio player. This would allow the user to select songs as MP3 files that have been downloaded into the media device, for playback through the built-in speaker or through the earphone jack 116 (see FIG. 2).

In accordance with an embodiment of the invention, yet another one of the applications 424 may be an acoustics test application as introduced above, that allows the user to command that an audio test signal be generated in the device 100 and emitted through the speaker or receiver, while simultaneously displaying the spectral and/or sound level characteristics of this generated audio test signal, i.e. its expected spectral content and/or sound level. In the environment of the acoustics test system 99 (see FIG. 1), these may be measured by an external SPL meter from the acoustic output of the built-in speaker or receiver. In addition, the acoustic test application may be designed to perform digital processing on an audio test signal sensed by the built-in microphone, and then to show the measured spectral content and/or sound level on the built-in display of the device 100. During development of the acoustic test application, a "known good [media] device" should be used to verify that the test application is, in fact, measuring (calculating) correctly the output of the built-in microphone, in the presence of a known and calibrated audio test signal. Similarly, during development of the receiver and speaker test portions of the test application, the software should be evaluated on a known good [media] device to ensure that it can calculate and deliver to the speaker or receiver the desired audio test signal that is to be emitted by the speaker or receiver.

Figure 5:
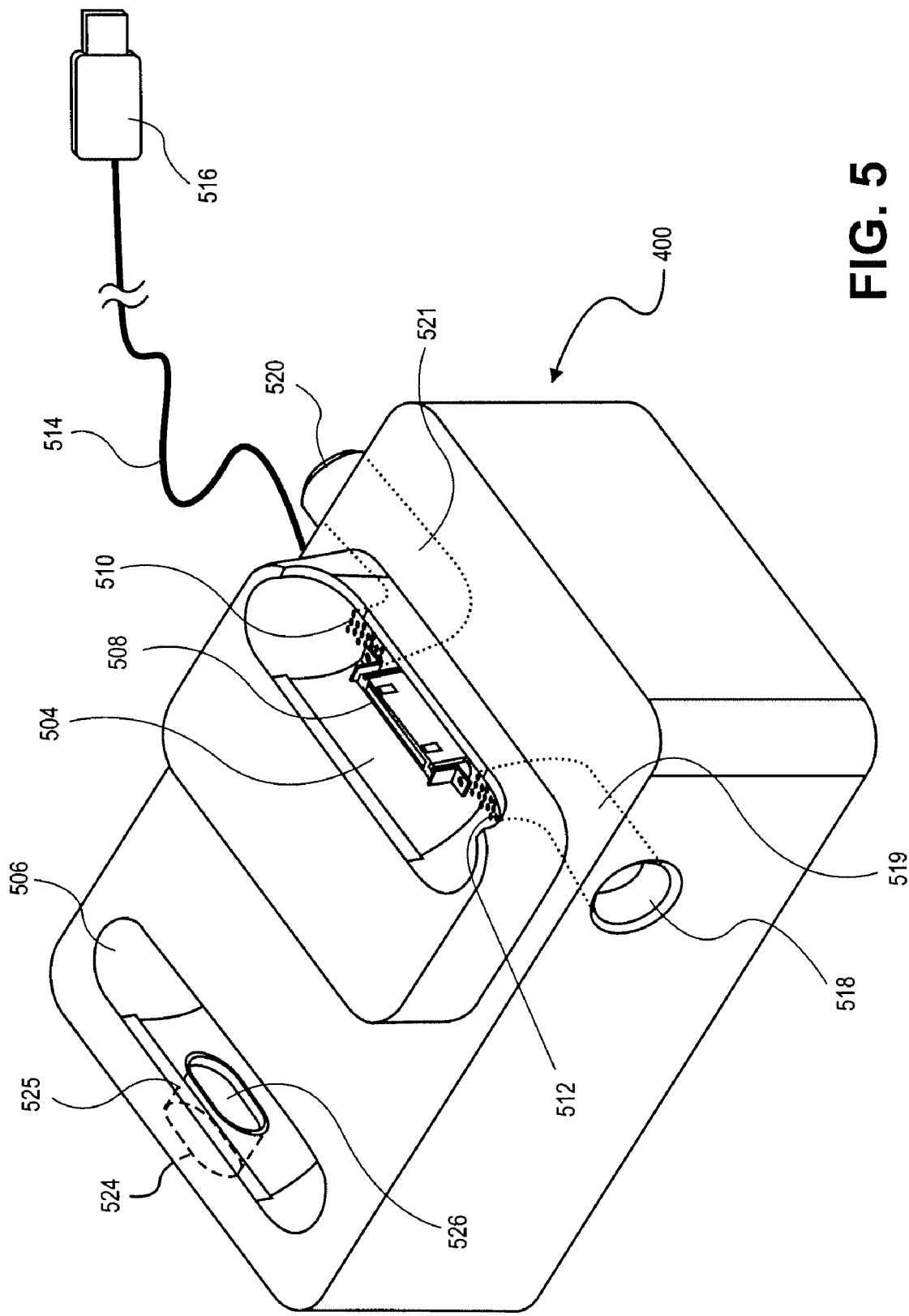
FIG. 5 is a plan view of an example test fixture.

Referring now to FIG. 5, a plan view of an example fixture 400 is shown that is suitable for a media device 100 having certain aspects that may be similar to those of the iPhone media device. In this case, there is a first hollow or cavity 504 and a second hollow or cavity 506 formed on the top surface of the fixture 400. These act as holsters for the media device 100. To test its speaker and/or microphone, the media device 100 is installed by being lowered into the first hollow 504, bottom end first, until it is resting against the top surface of the fixture 400. The first hollow is shaped to generally conform to the bottom end of the media device 100 so as to loosely hold the device substantially upright as shown, i.e. essentially perpendicular or slightly angled. The first hollow is defined in part by a lower, substantially horizontal surface in which are formed one or more acoustic apertures 510. These may be formed near one end of the hollow 504, at a location that is aligned with one or more acoustic apertures of the installed device 100 that are associated with a built-in microphone, to form part of an acoustic pathway 521 through which an acoustic test signal is to travel from inside a body of the test fixture into the microphone inside the device 100.

In addition to a microphone, the bottom end of the device 100 may also have a built-in speaker. In such an embodiment, the lower horizontal surface that in part defines the first hollow 504 has also formed therein one or more further acoustic apertures 512 at another end. These are at a location that is aligned with one or more acoustic apertures of the installed device 100 that are associated with the speaker, to form part of an acoustic pathway 519 through which an acoustic test signal will travel from the speaker inside the device 100 into the base or body of the test fixture.

In this embodiment, the first hollow 504 also has a further opening in the lower horizontal surface, between the apertures 512, 510 as shown, through which a docking connector 508 extends from inside the body of the test fixture 400. The docking connector 508 mates with another one, which is built into the bottom face of the media device 100. The docking connector 508 is connected to one end of a communication cable 514 whose other end has a further connector 516 connected to it. The latter mates with another connector that is built into the in-store computer 86 (see FIG. 1).

The test fixture also has a second hollow 506 formed on its top surface, also acting as a holster for the device 100. The device is installed by being lowered into the second hollow, this time top end first, until it is resting against the lower horizontal surface of the fixture within the second hollow. The second hollow 506 is shaped to generally conform to the top end of the device 100 so as to loosely hold the device upside down, substantially upright as shown, i.e. essentially perpendicular or slightly angled. The second hollow is defined in part by its lower horizontal surface in which are formed one or more acoustic apertures 526. These may be formed near the middle of the hollow as shown, at a location that is aligned with one or more further acoustic apertures of the installed device 100 that are associated with a receiver (also referred to as an earpiece that, in one embodiment, may only be used for telephony audio), to form part of an acoustic pathway 525 through which an acoustic test signal is to travel from the receiver into the body or base of the test fixture.

The test fixture also has a number of acoustic test ports. There is a microphone port 520, located in this example on one external side of the test fixture body, which may be a hole in the surface of the body that extends into the body and communicates with the acoustic pathway 521 through which the test signal is to travel into the microphone inside the device 100. In the particular example shown, the hole is ported through an otherwise solid portion of the body, all the way to the acoustic apertures 510 of the first hollow (that line up with those of the device built-in microphone). An off the shelf reference sound pressure source 606 may be used to generate the test signal. The reference sound source 606 may have a sound output port that simply slides onto a tube (shown in FIG. 5) that extends outward from the hole of the microphone port 520.

The test fixture 400 also has a speaker port 518, located in this example on another external side of the test fixture body. The speaker port 518 may also be a hole (in the surface of the body) that extends into the body and communicates with the acoustic pathway 519 through which the test signal is to travel from the device's built-in speaker. In the particular example shown, the hole is ported through an otherwise solid portion of the body, all the way to the acoustic aperture 512 of the first hollow 504 that line up with those of the device built-in speaker. An off the shelf sound pressure level, SPL, meter 604 may be used to measure the audio test signal. The SPL meter may have a sound input port that includes a tube, which simply slides into the hole of the speaker port 518.

The test fixture 400 also has a receiver port 524, located in this example on another external side of the test fixture body. The receiver port 524 may also be a hole (in the surface of the body) that extends into the body and communicates with the acoustic pathway 525 through which the test signal is to travel from the device's built-in receiver. In the particular example shown, the hole is ported through an otherwise solid portion of the body, all the way to the acoustic aperture 526 of the second hollow 506 that line up with those of the device built-in receiver. An off the shelf sound pressure level, SPL, meter 604 may be used to measure the audio test signal. The SPL meter has a sound input port that includes a tube, which slides into the hole of the receiver port 524. Both the reference sound source and SPL meter may be easily removed from their ports by a user, so that they can be re-used with other test fixtures in the retail store.

Note that in the example embodiment of FIG. 5, each of acoustic pathways 519, 521, and 525 are acoustically isolated from each other, e.g. by virtue of the acoustic barrier effect of the material that makes up the otherwise solid body in which the pathways 519, 521, and 525 have been formed.

In another embodiment, the test fixture 400 also has (embedded in its body) an earphone/headphone connector (e.g., a jack plug) that mates with the earphone connector 116 of the media device (see FIG. 2). This is used for testing the earphone output function of the media device 100. Referring now to FIG. 5, such a connector could be embedded in the lower, horizontal surface of the fixture 400, within the second hollow 506, at a location that is aligned with the earphone connector 116 of the installed media device 100. The embedded connector may be connected by a cable to an electrical input of an electro-acoustic transducer. The transducer would in that case produce sound in response to a test signal generated by the installed media device 100. An SPL meter can be acoustically coupled to the transducer output, to measure the sound pressure of the generated test signal. The user of the test fixture 400 can thus verify the earphone functionality of the installed media device 100, by reading the SPL meter and comparing the measured sound pressure level to the expected setting for the test signal. The latter may be displayed by the media device 100, simultaneously with the test signal being active.

Figure 6:
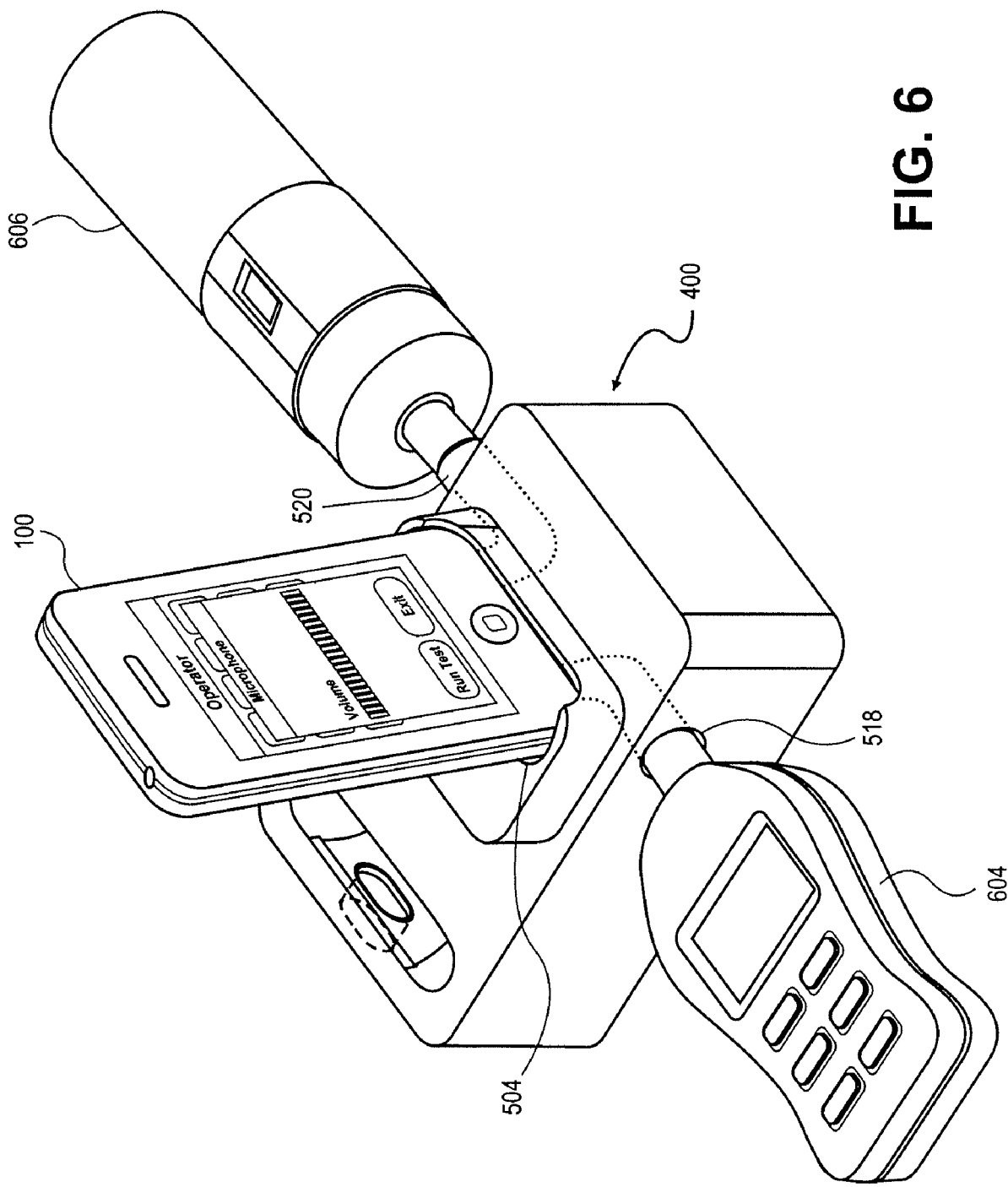
FIG. 6 shows the test fixture in use, during a microphone test and/or a speaker test.

FIG. 6 shows the test fixture in use, during a microphone test and/or a speaker test. In one embodiment, the microphone test only calls for the reference sound source 606 to be connected as shown (the SPL meter 604 need not be connected to the test fixture 400). The display of the device 100 shows a bar graph of the sound volume of the test signal provided by the reference sound source 606, as detected using the microphone and the "normal" internal audio signal processing path of the device 100 and controlled by the test application running in the device 100.

In another embodiment, the speaker test only calls for the SPL meter 604 to be connected as shown (the reference sound source 606 need not be connected to the test fixture 400). The test signal emitted by the built-in speaker of the device 100 may be generated by the test application running in the device 100. The test application causes the display of the device 100 to show the characteristics of the generated test signal (e.g., as part of spectral and sound level ranges). These can be readily compared by the consumer and store clerk, to what is shown on the digital display of the SPL meter as being detected at the speaker port 518.

Figure 7:
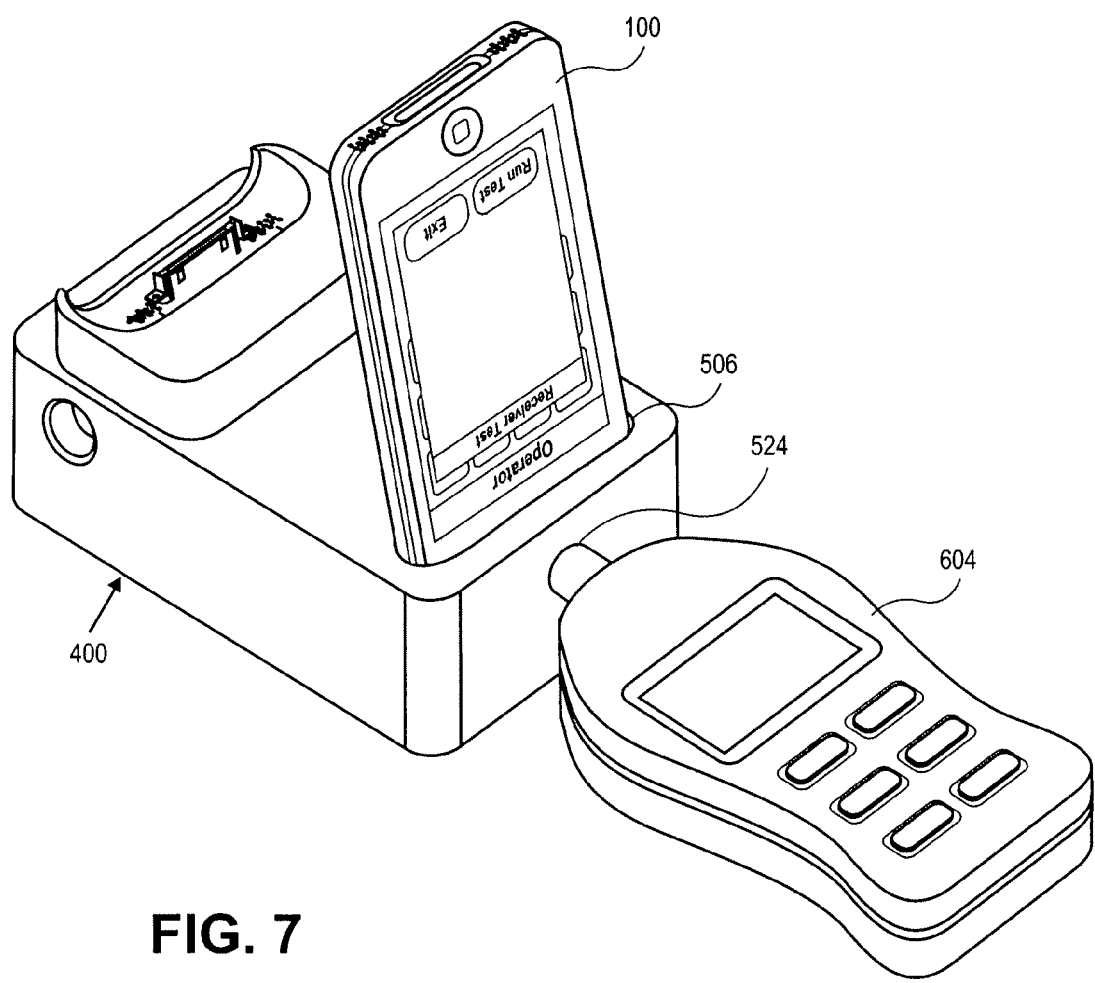
FIG. 7 shows the test fixture in use, during a receiver (earpiece) test.

FIG. 7 shows the fixture 400 in use, during a receiver test. Note that the device 100 has been inserted upside down, into the second hollow 506 of the test fixture 400. In this example, the receiver test only calls for the SPL meter 604 to be connected to the receiver port 524 as shown (the reference sound source 606 need not be connected to the test fixture 400 during this test). The test signal emitted by the built-in receiver of the device 100 may also be generated by the test application running in the device 100. The test application causes the display of the device 100 to show the characteristics of the generated test signal (e.g., as spectral and sound level ranges) during the test. These can be readily compared by the consumer and store clerk, to what is shown on the digital display of the SPL meter 604 as being detected at the receiver port 524.

Figure 9:
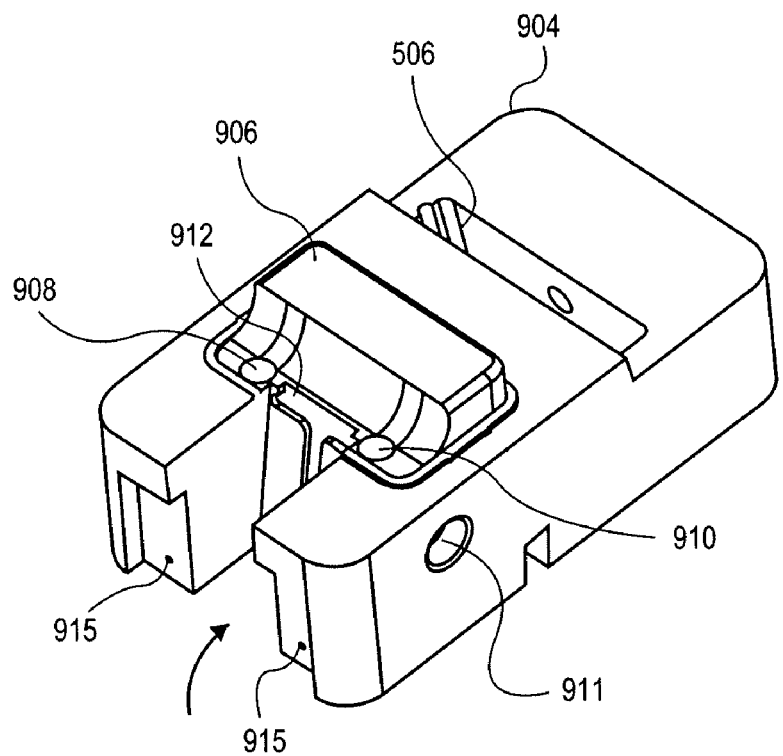
FIG. 9 is an elevation view of a body being a component of the example test fixture.
Figure 10:
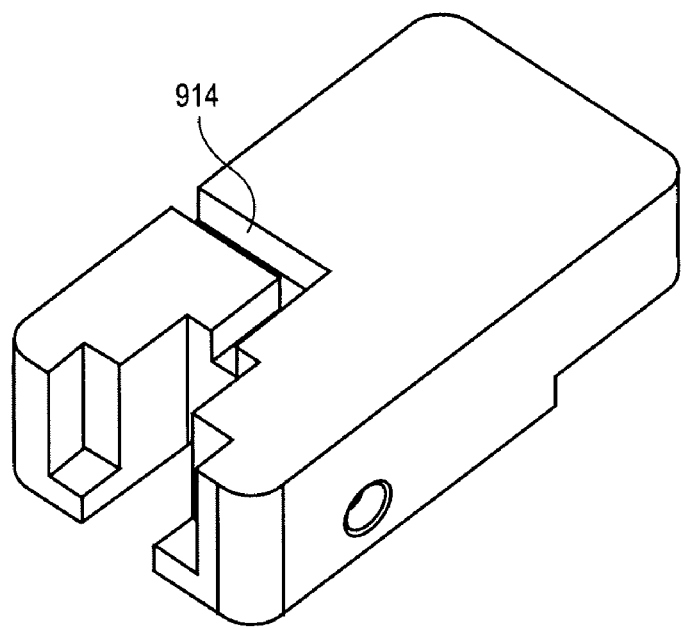
FIG. 10 is a bottom view of the body.
Figure 11:
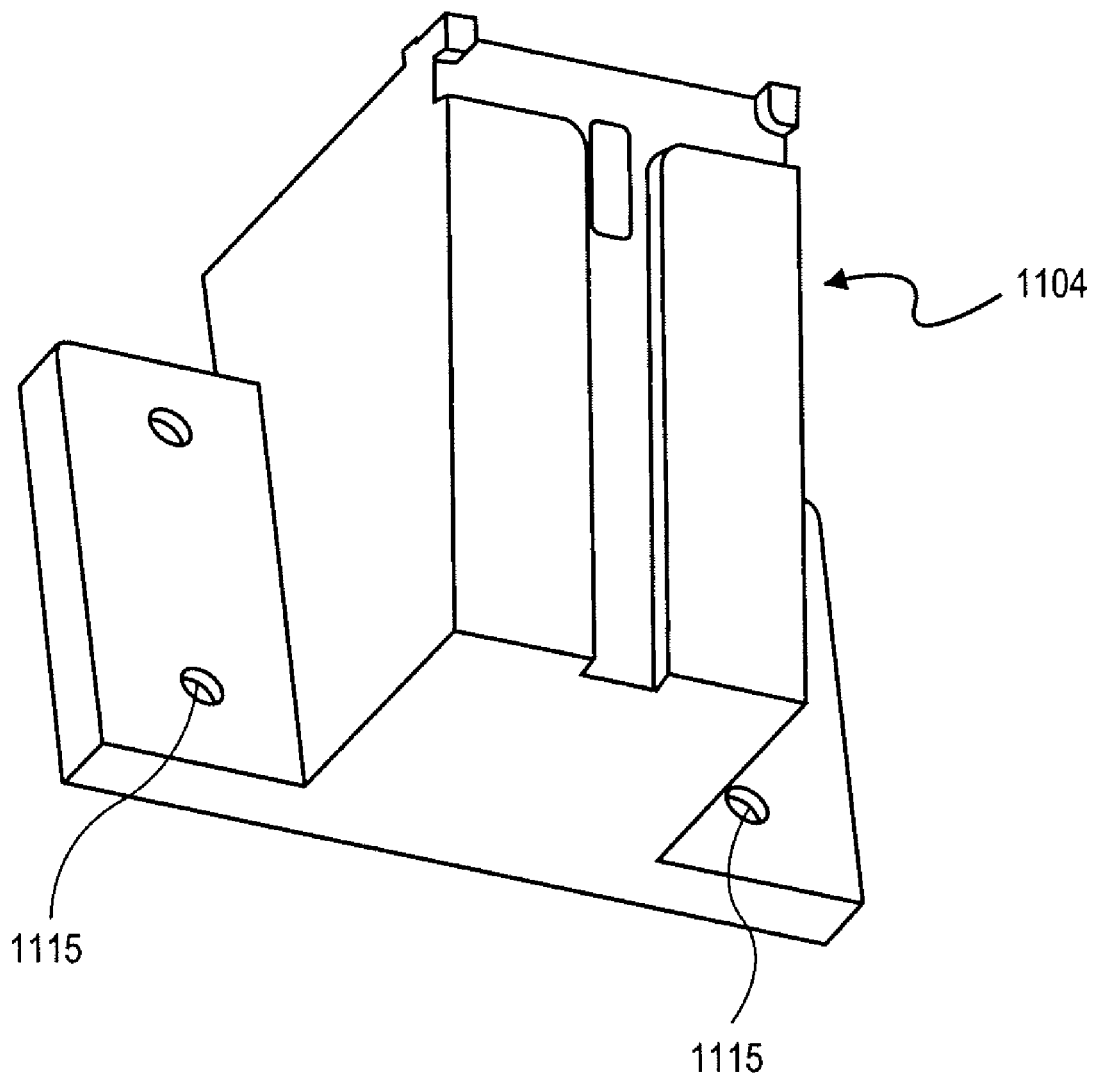
FIG. 11 is a perspective view of a locking block being another component of the example test fixture.

FIGS. 9-12 show an example test fixture 400 that is composed of three separate components that are assembled together to yield the test fixture shown in FIG. 5. Note that other ways of manufacturing the test fixture 400 are possible. In FIG. 9, a body 904 of the test fixture is shown in perspective view, with a bottom view of it in FIG. 10. The body may be made of a single, solid piece of rigid material such as ABS or PVC (or other sufficiently dense, sound insulating material) that can be easily machined to create the cutouts, shapes and bores depicted in the figures. The second hollow 506 may be machined out of the top surface as shown. A bore may be drilled into the rear side all the way through to the second hollow 506 as shown, to form the receiver port and complete the acoustic pathway that couples the receiver port to its associated acoustic aperture inside the hollow 506. Note that the acoustic pathway may have a different shape than shown, e.g. it may have enlarged regions, and may include acoustic resistance elements, so as to provide the needed acoustic coupling characteristics.

To achieve the first hollow 504 (see FIG. 5), the following operations may be performed (in no particular order). First, the body 904 is machined on its top surface to form a solid table 906 thereon, with a downward sloping front that ends in a centrally located connector pocket 912. The connector pocket 912 is shaped to mate with the external form factor of the docking connector 508 (see FIG. 5), so that the connector 508 can be lowered into and fits snugly within the pocket 912 and rests against a stop (not shown) in the pocket 912. The stop is positioned so that the height of the connector 508 is sufficiently above the top surface of the body to engage the mating connector of the device 100 (once the latter has been installed in the test fixture).

The downward sloping front of the table 906 may define the shape of the first hollow 504. At the bottom of the sloping front, at one end, is a bore 910 that runs downward into the body 904 until it meets its respective horizontal bore 911 which runs outward to a side surface of the body to form part of the microphone port 520 and the acoustic pathway that is used for the microphone test (see FIG. 5). Similarly, a bore 908 (at the other end of the bottom of the sloping front of the table 906) runs downward until it meets its respective horizontal bore (not shown) which runs outward to another side surface of the body. These form part of the speaker port 518 and the acoustic pathway that is used for the speaker test.

The body 904 also has a cutout in its front side surface as shown that extends to the connector pocket 912 and is keyed to receive a mating, locking block 1104. Once the connector 508 is positioned within the pocket 912, it is locked in place by inserting the locking block 1104 into its mating cutout until the block 1104 rests against the connector 508, and then fastening the block 1104 to the body 904, e.g. at fastening locations 915 on the body corresponding to locations 1115 on the block 1104. Alternatively, some type of snap lock mechanism may be used to keep the block 1104 fixed inside its cutout in the body. Note that the cord to which the connector is attached is routed out of the body through a trough 914. This allows the connector cord to be passed out of the body while the entire bottom surface of the body remains flush against a tabletop.

Figure 12:
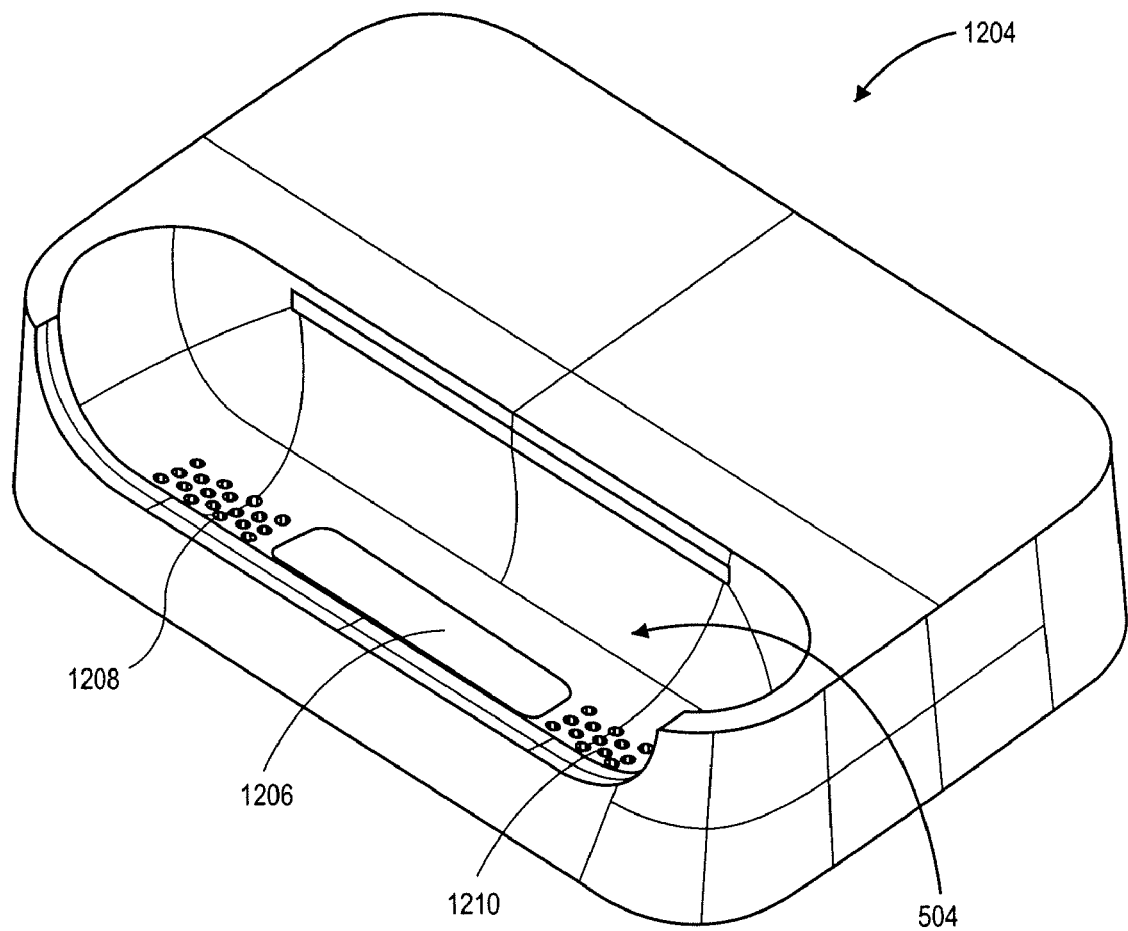
FIG. 12 is a perspective view of a docking housing or shell being another component of the example test fixture.

To complete the test fixture and in particular the first hollow 504, a docking housing or shell 1204 is formed, such as by injection molding of plastic, into the shape shown in FIG. 12. The bottom of the shell 1204 is hollow and conforms to the shape of the table 906 and its downward sloping front end (see FIG. 9). The front of the shell 1204 (in which the hollow 504 is defined) has a centrally located hole 1206 through which the connector 508 extends out, above the top surface of the test fixture. On either side of the hole 1206 are acoustic apertures 1208 (speaker) and 1210 (microphone), which are aligned with their respective bores 908 and 910 (see FIG. 9). The shell 1204 may be snap-fitted into place over the table 906, to essentially yield an exterior top surface of the test fixture as shown in FIG. 5.

The invention is not limited to the specific embodiments described above. For example, although in FIG. 9, the body of the test fixture is shown as having the second hollow 506 be essentially parallel to the first hollow 506, an alternative is to have the second hollow 506 be essentially perpendicular so that the receiver port is located on the same side of the body as either the microphone port or the speaker port. Accordingly, other embodiments are within the scope of the claims.

What is claimed is:

1. A system for audio testing a portable media device, comprising:
a portable handheld test fixture having an acoustic port selected from the group consisting of a speaker port, a microphone port, and an earpiece port, wherein said port becomes acoustically coupled, through a first acoustic pathway ported all the way through a body of the test fixture to a respective acoustic aperture of the media device, which is associated with a speaker, a microphone, or an earpiece of the device, once the device has been installed onto the test fixture; and
a sound test tool selected from the group consisting of a reference sound source and a sound pressure level, SPL, meter, the sound test tool having an input or output sound port that is to be removably coupled to said acoustic port of the test fixture.

2. The system of claim 1 wherein said acoustic port is the speaker port, which is acoustically coupled, through the first acoustic pathway formed in the body of the test fixture, to a respective acoustic aperture of the media device that is associated with a speaker of the device, and the sound test tool is the SPL meter to be removably coupled to the speaker port.

3. The system of claim 2 wherein the test fixture further comprises an acoustic microphone port, which is acoustically coupled, through a second acoustic pathway distinct from the first acoustic pathway, formed in the body of the test fixture, to a respective acoustic aperture of the media device that is associated with a microphone of the device,
the system further comprising a reference sound source that is to be removably coupled to the acoustic microphone port.

4. The system of claim 3 wherein the test fixture further comprises an acoustic earpiece port, which is acoustically coupled, through a third acoustic pathway, distinct form the first acoustic pathway and the second acoustic pathway, formed in the body of the test fixture, to a respective acoustic aperture of the media device that is associated with an earpiece of the device,
wherein the SPL meter is to be removably coupled to the acoustic earpiece port.

5. The system of claim 1 wherein the test fixture further comprises a docking connector that mates with a corresponding connector of the device, once the device has been installed onto the test fixture.

6. The system of claim 5 further comprising a computer that is coupled to the docking connector of the test fixture through a cable, the computer having stored therein software that when executed by the computer checks for updates to user software in the device and downloads audio test code, to be used for testing acoustic functions of the device, into the device via the cable.

7. The system of claim 1 further comprising a computer that is communicatively coupled to the device through a wireless connection, the computer having stored therein software that when executed by the computer checks for updates to user software in the device and downloads audio test code into the device via the wireless connection.

8. The system of claim 1 further comprising a computer that is communicatively coupled to the device by a wired or wireless connection, the computer having stored therein software that when executed by the computer checks for updates to user software in the device using said connection.

9. The system of claim 3 further comprising the media device, the media device further comprising a display, and wherein the media device implements a digital media player function that plays one of music through the speaker and video through the display,
and wherein the media device is to a) emit a first audio test signal by the speaker and simultaneously show a spectral and/or sound level characteristic of the first audio test signal on the display, and b) measure a second audio test signal being detected by the microphone and simultaneously show a spectral and/or sound level characteristic of the measured signal on the display.

10. The apparatus of claim 9 further comprising the media device having an earpiece, the media device further implements a wireless telephony function that allows a user to hear a telephone call through the earpiece,
and wherein the media device is to emit a third audio test signal by the earpiece and simultaneously show a spectral and/or sound level characteristic of the third audio test signal on the display.

11. The system of claim 3 further comprising the media device, the media device being a cellular telephone handset which includes a display and an earpiece,
and wherein the handset implements a wireless telephony function that allows a user to hear a telephone call through the earpiece,
and wherein the handset is to a) emit an audio test signal by the earpiece and simultaneously show a spectral and/or sound level characteristic of the audio test signal on the display, and b) measure another audio test signal being detected by the microphone and simultaneously show a spectral and/or sound level characteristic of the measured signal on the display.

12. An acoustic test fixture comprising:
a body having formed therein a) a pocket adapted to receive therein a personal media device docking connector, and b) an acoustic channel ported all the way through the body from a port in a surface of the body that is adapted to engage a sound test tool, to an aperture in the body that is positioned to be aligned with a speaker, microphone or earpiece of a personal media device when the media device is installed in the test fixture.

13. The acoustic test fixture of claim 12 wherein the body comprises a further pocket adapted to receive therein a personal media device earphone/headphone connector.

14. The acoustic test fixture of claim 12 wherein the body has a first cavity formed above its flat, exterior bottom surface, the cavity being adapted to receive therein a bottom end of the media device so as to support the media device in a substantially upright orientation.

15. The acoustic test fixture of claim 14 wherein the body has a second cavity formed above its flat, exterior bottom surface, the cavity being adapted to receive therein a top end of the media device so as to support the media device upside down in a substantially upright orientation.

16. An acoustic test fixture comprising:
a body having formed therein an acoustic channel ported all the way through the body from a port in a surface of the body, that is adapted to engage a sound test tool, to an aperture in the body that is positioned to be aligned with a speaker, microphone or earpiece of a personal media device when the media device is installed in the test fixture.

17. The acoustic test fixture of claim 16 wherein the body further comprises a pocket having embedded therein a connector that mates with a built-in earphone/headphone connector of the personal media device.

18. The acoustic test fixture of claim 16 wherein the body has a first upward facing cavity formed above its flat, exterior bottom surface, the first cavity being adapted to receive therein a bottom end of the media device so as to support the media device in a substantially upright orientation.

19. The acoustic test fixture of claim 18 wherein the body has a second upward facing cavity formed above its flat, exterior bottom surface, the second cavity being adapted to receive therein a top end of the media device so as to support the media device upside down in a substantially upright orientation.

20. A test fixture comprising:
first means for supporting a portable media device upside down such that an end of the media device having a receiver is supported by the first means;
first acoustic port means for coupling with an acoustic port of a sound test tool; and
means for acoustically coupling a first test signal, generated by the receiver of the media device while the media device is supported by the first means, to the first acoustic port means.

21. The test fixture of claim 20 further comprising:
second means for supporting the portable media device right side up;
second acoustic port means for coupling with an acoustic port of a sound test tool; and
means for acoustically coupling a second test signal, generated by the sound test tool, to the second acoustic port means, while the media device is supported by the second means.

* * * * *